United States Patent
Rached

(10) Patent No.: US 10,669,465 B2
(45) Date of Patent: *Jun. 2, 2020

(54) COMPOSITION COMPRISING 1-CHLORO-3,3,3-TRIFLUOROPROPENE

(71) Applicant: Arkema France, Colombes (FR)

(72) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/333,003

(22) PCT Filed: Sep. 15, 2017

(86) PCT No.: PCT/FR2017/052473
§ 371 (c)(1),
(2) Date: Mar. 13, 2019

(87) PCT Pub. No.: WO2018/051036
PCT Pub. Date: Mar. 22, 2018

(65) Prior Publication Data
US 2019/0276721 A1  Sep. 12, 2019

(30) Foreign Application Priority Data

Sep. 19, 2016  (FR) ..................... 16 58751

(51) Int. Cl.
C09K 5/04 (2006.01)
C10M 105/38 (2006.01)
F02C 1/00 (2006.01)
C10M 171/00 (2006.01)

(52) U.S. Cl.
CPC .............. *C09K 5/048* (2013.01); *C09K 5/044* (2013.01); *C10M 105/38* (2013.01); *C10M 171/00* (2013.01); *C10M 171/008* (2013.01); *F02C 1/005* (2013.01); *C09K 2205/126* (2013.01); *C09K 2205/24* (2013.01); *C10M 2205/024* (2013.01); *C10M 2205/026* (2013.01); *C10M 2205/028* (2013.01); *C10M 2207/2835* (2013.01); *C10N 2220/027* (2013.01); *C10N 2220/028* (2013.01); *C10N 2220/301* (2013.01); *C10N 2220/302* (2013.01); *C10N 2230/08* (2013.01); *C10N 2230/10* (2013.01); *C10N 2240/30* (2013.01)

(58) Field of Classification Search
CPC .... C09K 5/044; C09K 5/045; C09K 2205/12; C09K 5/00; C09K 2205/126; C09K 2205/122; C09K 2205/22; C09K 15/20; C09K 2205/32; C09K 2205/40; C09K 2208/10; C09K 3/30; C09K 5/04; C09K 5/10; C09K 5/14; C09K 8/584; C09K 8/588

See application file for complete search history.

(56) References Cited

U.S. PATENT DOCUMENTS

| | | |
|---|---|---|
| 5,065,990 A | 11/1991 | Durfee |
| 5,363,674 A | 11/1994 | Powell |
| 6,013,846 A | 1/2000 | Wismer et al. |
| 6,646,020 B2 | 11/2003 | Nyberg et al. |
| 6,814,884 B2 | 11/2004 | Jannick et al. |
| 7,438,826 B1 | 10/2008 | Chen et al. |
| 7,442,321 B1 | 10/2008 | Chen et al. |
| 8,323,524 B2 | 12/2012 | Flynn et al. |
| 8,450,537 B2 | 5/2013 | Rao et al. |
| 8,541,478 B2 | 9/2013 | Singh et al. |
| 8,754,272 B2 | 6/2014 | Zhai et al. |
| 8,790,539 B2 | 7/2014 | Abbas |
| 9,157,018 B2 | 10/2015 | Rached et al. |
| 9,255,045 B2 | 2/2016 | Pigamo et al. |
| 9,267,065 B2 | 2/2016 | Van Horn et al. |
| 9,279,074 B2 | 3/2016 | Rached |
| 9,528,038 B2 | 12/2016 | Rached et al. |
| 9,834,499 B2 | 12/2017 | Pigamo et al. |
| 9,908,828 B2 * | 3/2018 | Rached ............. C07C 17/42 |
| 9,982,178 B2 | 5/2018 | Rached et al. |
| 10,036,285 B2 | 7/2018 | Rached |
| 10,077,221 B2 | 9/2018 | Bonnet et al. |
| 10,266,465 B2 | 4/2019 | Bonnet et al. |
| 10,343,963 B2 | 7/2019 | Bonnet |
| 10,399,918 B2 * | 9/2019 | Rached ............. F01K 25/10 |
| 10,407,603 B2 | 9/2019 | Rached et al. |
| 10,427,998 B2 | 10/2019 | Pigamo et al. |
| 2004/0180978 A1 | 9/2004 | Dreier |
| 2005/0156135 A1 | 7/2005 | Minor et al. |
| 2005/0285079 A1 | 12/2005 | Minor |
| 2006/0106263 A1 | 5/2006 | Miller et al. |
| 2006/0142173 A1 | 6/2006 | Johnson et al. |
| 2006/0266976 A1 | 11/2006 | Minor et al. |
| 2007/0100173 A1 | 5/2007 | Miller et al. |
| 2007/0100175 A1 | 5/2007 | Miller et al. |
| 2007/0145325 A1 | 6/2007 | Minor |

(Continued)

FOREIGN PATENT DOCUMENTS

CN  101155892 A  4/2008
EP  0 940 382 A1  9/1999

(Continued)

OTHER PUBLICATIONS

International Search Report (PCT/ISA/210) dated Nov. 12, 2017, by the European Patent Office as the International Searching Authority for International Application No. PCT/FR2017/052473.

(Continued)

*Primary Examiner* — John R Hardee
(74) *Attorney, Agent, or Firm* — Buchanan Ingersoll & Rooney P.C.

(57) ABSTRACT

A composition including at least one lubricant including polyol esters and a refrigerant fluid F including 1-chloro-3,3,3-trifluoropropene. Also, a composition including at least one lubricant based on polyol esters and a refrigerant fluid F including 1-chloro-3,3,3-trifluoropropene and at least one C3 to C6 alkene stabilizing compound including a single double bond. Also, different uses of the compositions.

15 Claims, No Drawings

(56) References Cited

U.S. PATENT DOCUMENTS

| | | |
|---|---|---|
| 2008/0051612 A1 | 2/2008 | Knapp et al. |
| 2008/0098755 A1 | 5/2008 | Singh et al. |
| 2008/0125505 A1 | 5/2008 | Bowman et al. |
| 2009/0095014 A1 | 4/2009 | Sun et al. |
| 2009/0099274 A1 | 4/2009 | Van Der Puy et al. |
| 2009/0127496 A1 | 5/2009 | Rao et al. |
| 2009/0253820 A1 | 10/2009 | Bowman et al. |
| 2009/0305876 A1 | 12/2009 | Singh et al. |
| 2009/0318323 A1 | 12/2009 | Johnson et al. |
| 2010/0004155 A1 | 1/2010 | Ishihara et al. |
| 2010/0072415 A1 | 3/2010 | Rao |
| 2010/0102273 A1 | 4/2010 | Basu et al. |
| 2010/0105788 A1 | 4/2010 | Chen et al. |
| 2010/0113629 A1 | 5/2010 | Van Horn et al. |
| 2010/0154444 A1 | 6/2010 | Hulse et al. |
| 2010/0187088 A1 | 7/2010 | Merkel et al. |
| 2010/0237279 A1 | 9/2010 | Hulse et al. |
| 2011/0041529 A1 | 2/2011 | Chen et al. |
| 2011/0112340 A1 | 5/2011 | Smith et al. |
| 2011/0197602 A1 | 8/2011 | Abbas et al. |
| 2011/0218369 A1 | 9/2011 | Elsheikh et al. |
| 2011/0309287 A1 | 12/2011 | Chen et al. |
| 2011/0309288 A1 | 12/2011 | Chen et al. |
| 2011/0315915 A1 | 12/2011 | Abbas et al. |
| 2012/0041239 A1 | 2/2012 | Suzuki et al. |
| 2012/0053369 A1 | 3/2012 | Hulse et al. |
| 2012/0053372 A1 | 3/2012 | Hulse et al. |
| 2012/0056122 A1 | 3/2012 | Hulse et al. |
| 2012/0117990 A1 | 5/2012 | Rached |
| 2012/0138841 A1 | 6/2012 | Hulse et al. |
| 2012/0138847 A1 | 6/2012 | Van Horn et al. |
| 2012/0145955 A1 | 6/2012 | Abbas et al. |
| 2012/0222448 A1 | 9/2012 | Chaki et al. |
| 2012/0329689 A1 | 12/2012 | Rebrovic et al. |
| 2012/0329893 A1 | 12/2012 | Abbas |
| 2013/0037058 A1 | 2/2013 | Abbas |
| 2013/0105296 A1 | 5/2013 | Chaki et al. |
| 2013/0119300 A1 | 5/2013 | Van Horn et al. |
| 2013/0231399 A9 | 9/2013 | Basu et al. |
| 2014/0012052 A1 | 1/2014 | Pham et al. |
| 2015/0152235 A1 | 6/2015 | Abbas |
| 2015/0197467 A1 | 7/2015 | Pigamo et al. |
| 2016/0009555 A1 | 1/2016 | Bonnet et al. |
| 2016/0009973 A1 | 1/2016 | Rached et al. |
| 2016/0023176 A1 | 1/2016 | Bonnet et al. |
| 2016/0023974 A1 | 1/2016 | Bonnet et al. |
| 2016/0031773 A1 | 2/2016 | Bonnet et al. |
| 2016/0046548 A1 | 2/2016 | Bonnet et al. |
| 2016/0115104 A1 | 4/2016 | Pigamo et al. |
| 2016/0178254 A1 | 6/2016 | Nishiguchi et al. |
| 2016/0272561 A1 | 9/2016 | Rached et al. |
| 2017/0044461 A1 | 2/2017 | Takahashi et al. |
| 2018/0093934 A1 | 4/2018 | Pigamo et al. |
| 2018/0126348 A1 | 5/2018 | Bonnet et al. |
| 2018/0148394 A1 | 5/2018 | Pigamo et al. |
| 2018/0194703 A1 | 7/2018 | Chiu et al. |
| 2018/0320560 A1 | 11/2018 | Rached |
| 2018/0354875 A1 | 12/2018 | Bonnet |
| 2019/0040292 A1 | 2/2019 | Rached |
| 2019/0048241 A1 | 2/2019 | Abbas et al. |

FOREIGN PATENT DOCUMENTS

| | | |
|---|---|---|
| JP | S62-225860 A | 10/1987 |
| JP | H02-120338 A | 5/1990 |
| JP | H03-168566 A | 7/1991 |
| JP | H04110388 A | 4/1992 |
| JP | H06-272978 A | 9/1994 |
| JP | H 07-6707 B2 | 1/1995 |
| JP | 2002-501035 A | 1/2002 |
| JP | 2008-133438 A | 6/2008 |
| JP | 2008-524433 A | 7/2008 |
| JP | 2011-037912 A | 2/2011 |
| JP | 2011-510119 A | 3/2011 |
| JP | 2012-506944 A | 3/2012 |
| WO | WO 99/37598 A1 | 7/1999 |
| WO | WO 02/40613 A1 | 5/2002 |
| WO | WO 2004/037913 A2 | 5/2004 |
| WO | WO 2004/037913 A3 | 5/2004 |
| WO | WO 2006/069362 A2 | 6/2006 |
| WO | WO 2006/069362 A3 | 6/2006 |
| WO | WO 2007/002625 A2 | 1/2007 |
| WO | WO 2007/002625 A3 | 1/2007 |
| WO | WO 2007/053736 A2 | 5/2007 |
| WO | WO 2008/002500 A1 | 1/2008 |
| WO | WO 2009/089511 A2 | 7/2009 |
| WO | WO 2009/140231 A2 | 11/2009 |
| WO | WO 2010/043807 A1 | 4/2010 |
| WO | WO 2010/059493 A1 | 5/2010 |
| WO | WO 2010/062572 A2 | 6/2010 |
| WO | WO 2010/062572 A3 | 6/2010 |
| WO | WO 2010/085397 A1 | 7/2010 |
| WO | WO 2010/088196 A2 | 8/2010 |
| WO | WO 2010/088196 A3 | 8/2010 |
| WO | WO 2012/075283 A2 | 6/2012 |
| WO | 2012177742 A2 | 12/2012 |
| WO | WO 2014/147310 A1 | 9/2014 |
| WO | WO 2014/147311 A1 | 9/2014 |
| WO | WO 2014/147312 A1 | 9/2014 |
| WO | WO 2014/147313 A1 | 9/2014 |
| WO | WO 2014/147314 A1 | 9/2014 |
| WO | 2015163072 A1 | 10/2015 |
| WO | 2016112363 A1 | 7/2016 |
| WO | 2016146940 A1 | 9/2016 |

OTHER PUBLICATIONS

Written Opinion (PCT/ISA/237) dated Nov. 12, 2017, by the European Patent Office as the International Searching Authority for International Application No. PCT/FR2017/052473.

U.S. Appl. No. 16/545,294, filed Jun. 4, 2015, Pigamo, et al.

Official Action issued in JP 2011-531537, dated 20 Jan. 2016, 7 pages, Japan Patent Office, JP.

Official Action issued in JP 2015-026010, dated Mar. 1, 2016, 6 pages (3 pages JP OA; 3 pages Machine English-language translation), Japanese Patent Office, JP.

Notice of Opposition mailed in EP 2 334 750, dated Jan. 17, 2019, 15 pages, European Patent Office, Munich, DE.

Forane Blowing Agents by Arkema, Technical Profile Forane® 1233zd, copyright 2013, Arkema, King of Prussia, PA, www.forane.com, retrieved Jun. 2017, 6 pages.

Yamamoto, Hiroyasu, et al., "Compression Type Heat Pump", Application and Economy of Heat Pump, Technical Report, No. 52, Chapter 4, Feb. 27, 1984, pp. 117-134 (22 pages including Partial English-language translation).

Official Action issued in CN 201610607752.3, dated Sep. 26, 2018, 6 pages (English-language translation only), State Intellectual Property Office of the People's Republic of China, CN.

Zheng, Zuyi, *Application of Heat Pump Technology in Air Conditioning*, China Mechanical Press, 1st edition, Jul. 1998, five pages including p. 9, title page, publisher information, and English-language translation of p. 9.

Xiuling Yuan, Editor, *Refrigeration and Air-Conditioning Apparatus*, Xi'an Jiaotong University Press, $1^{st}$ edition, Mar. 2001, four pages including p. 37, title page, publisher information, and English-language translation of p. 37.

Pigamo, Anne, et al., U.S. Appl. No. 16/545,294 entitled "Compositions Based on 1,1,3,3-Tetrachloropropene," filed Aug. 20, 2019.

U.S. Appl. No. 14/615,900, Wissam Rached, filed Feb. 6, 2015, (Cited herein as US Patent Application Publication No. 2015/0152235 A1 of Jun. 4, 2015).

U.S. Appl. No. 16/027,743, Laurent Abbas and Wissam Rached, filed Jul. 5, 2018 (Cited herein as US Patent Application Publication No. 2019/0048241 A1 of Feb. 14, 2019).

U.S. Appl. No. 15/809,488, Anne Pigamo, John Wismer, Bertrand Collier and Philippe Bonnet, filed Nov. 10, 2017 (Cited herein as US Patent Application Publication No. 2018/0093934 A1 of Apr. 5, 2018).

U.S. Appl. No. 16/545,294, Anne Pigamo and Bertrand Collier, filed Aug. 20, 2019.

* cited by examiner

COMPOSITION COMPRISING 1-CHLORO-3,3,3-TRIFLUOROPROPENE

FIELD OF THE INVENTION

The present invention relates to a composition containing 1-chloro-3,3,3-trifluoropropene and at least one lubricant, able to be used in refrigeration, air conditioning and heat pumps.

TECHNICAL BACKGROUND

The problems posed by substances that deplete the atmospheric ozone layer were dealt with in Montreal, where the protocol was signed, decreeing a reduction in the production and use of chlorofluorocarbons (CFCs). This protocol has been subject to amendments which ordered the abandonment of CFCs and extended the regulation to other products including hydrochlorofluorocarbons (HCFCs).

The refrigeration and air conditioning industry has heavily invested in substitutions for these refrigerant fluids and thus hydrofluorocarbons (HFC) have been commercialized.

In the automotive industry, air conditioning systems for vehicles sold in numerous countries have gone from a chlorofluorocarbon-based (CFC-12) refrigerant fluid to one which is hydrofluorocarbon-based (1,1,1,2-tetrafluoroethane: HFC-134a), which is less harmful to the ozone layer. However, in light of the objectives set by the Kyoto protocol, HFC-134a (GWP=1430) is considered to have a high warming power. A fluid's contribution to the greenhouse effect is quantified by a criterion, GWP (Global Warming Potential) which sums up the warming power by giving a reference value of 1 to carbon dioxide.

Hydrofluoroolefins (HFO) have a relatively low warming power and therefore meet the objectives set by the Kyoto protocol. Document JP 4-110388 discloses hydrofluoropropenes as heat-transfer agent.

In the industrial field, the most commonly used refrigerant machines are based on cooling by evaporation of a liquid refrigerant fluid. After vaporization, the fluid is compressed then cooled in order to return to the liquid state and thus continue the cycle.

The refrigeration compressors used are of the reciprocating, scroll, centrifugal or screw type. In general, internal lubrication of the compressors is essential in order to reduce wear and heating of the moving members, complete their leaktightness and protect them against corrosion.

In addition to good heat-transfer agent properties, in order for a refrigerant fluid to be commercially accepted, it must especially exhibit thermal stability and compatibility with lubricants. Indeed, it is highly desirable for the refrigerant fluid to be compatible with the lubricant used in the compressor, present in the majority of refrigeration systems. This combination of refrigerant fluid and lubricant is important for the implementation and the efficiency of the refrigeration system; the lubricant should especially be sufficiently soluble or miscible in the refrigerant fluid over the entire operating temperature range.

There is therefore a need to find novel refrigerant fluid and lubricant pairs which especially are thermally stable and which are able to be used in refrigeration, air conditioning and heat pumps.

DESCRIPTION OF THE INVENTION

The subject of the present application is a composition comprising a refrigerant fluid F comprising 1-chloro-3,3,3-trifluoropropene (HCFO-1233zd), and at least one lubricant based on polyol esters (POEs).

In the context of the invention, "HCFO-1233zd" refers to 1-chloro-3,3,3-trifluoropropene, regardless of knowing whether this is the cis or trans form. The terms "HCFO-1233zdZ" and "HCFO-1233zdE" refer to the cis and trans forms, respectively, of 1-chloro-3,3,3-trifluoropropene. The term "HCFO-1233zd" therefore covers HCFO-1233zdZ, HCFO-1233zdE, and all the mixtures of the two isomeric forms in all proportions.

Unless indicated otherwise, throughout the application the indicated proportions of compounds are given as percentages by weight.

The applicant has discovered that the compositions according to the invention are advantageously thermally stable.

Refrigerant Fluid

According to one embodiment, the refrigerant fluid F comprises at least one stabilizing compound.

The stabilizing compound according to the invention may be any stabilizing compound known in the field of refrigerant fluids.

Among the stabilizers, mention may in particular be made of nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (alkyl which is optionally fluorinated or perfluorinated or alkenyl or aromatic) such as n-butyl glycidyl ether, hexanediol diglycidyl ether, allyl glycidyl ether, butylphenylglycidyl ether, phosphites, phosphonates, thiols and lactones.

According to a preferred embodiment, the stabilizing compound does not contain halogen, preferably does not contain fluorine.

According to a preferred embodiment, the stabilizing compound is a C3 to C6 alkene comprising a single double bond.

The present invention relates to a composition comprising:
 a refrigerant fluid F comprising 1-chloro-3,3,3-trifluoropropene (HCFO-1233zd) and at least one C3 to C6 alkene stabilizing compound comprising a single double bond; and
 at least one lubricant based on polyol esters (POEs).

According to a preferred embodiment, the C3 to C6 alkene stabilizing compound comprising a single double bond does not contain halogen, preferably does not contain fluorine.

Preferably, the stabilizing compound is selected from the group consisting of propene, butenes, pentenes and hexenes; said propenes, butenes and pentenes preferably do not comprise any halogen atom, such as for example fluorine atom. Butenes and pentenes are preferred. Pentenes are even more particularly preferred.

Preferably, the stabilizing compound is a branched C5 alkene compound.

The C3 to C6 alkene stabilizing compounds may be linear-chain or branched-chain. They are preferably branched-chain.

Preferably, said stabilizing compounds have a boiling point of less than or equal to 100° C., more preferably still less than or equal to 75° C., and even more particularly preferably less than or equal to 50° C.

In the context of the invention, "boiling point" is intended to mean the boiling point at a pressure of 101.325 kPa, as determined according to standard NF EN 378-1 of April 2008.

Also preferably, they have a solidification temperature of less than or equal to 0° C., preferably less than or equal to −25° C., and even more particularly preferably less than or equal to −50° C.

The solidification temperature is determined according to Test no. 102: Melting point/Melting range (OECD guidelines for the testing of chemicals, Section 1, OECD publications, Paris, 1995, available at the web address http://dx.doi.org/10.1787/9789264069534-fr).

Preferred stabilizing compounds of the invention are selected from the following group:
but-1-ene;
cis-but-2-ene;
trans-but-2-ene;
2-methylprop-1-ene;
pent-1-ene;
cis-pent-2-ene;
trans-pent-2-ene;
2-methylbut-1-ene;
2-methylbut-2-ene; and
3-methylbut-1-ene.

Among the preferred compounds, mention may be made of 2-methylbut-2-ene, of formula $(CH_3)_2C=CH-CH_3$ (boiling point approximately 39° C.); and 3-methylbut-1-ene, of formula $CH_3-CH(CH_3)-CH=CH_2$ (boiling point of approximately 25° C.).

Two or more than two of the above compounds may also be used in combination.

The proportion by weight of the stabilizing compound(s) as described above in the refrigerant fluid F may especially be: from 0.01 to 0.05%; or from 0.05 to 0.1%; or from 0.1 to 0.2%, or from 0.2 to 0.3%; or from 0.3 to 0.4%; or from 0.4 to 0.5%; or from 0.5 to 0.6%; or from 0.6 to 0.7%; or from 0.7 to 0.8%; or from 0.8 to 0.9%; or from 0.9 to 1%; or from 1 to 1.2%; or from 1.2 to 1.5%; or from 1.5 to 2%; or from 2 to 3%; or from 3 to 4%; or from 4 to 5% relative to the total weight of refrigerant fluid F.

According to a preferred embodiment, the refrigerant fluid F consists of 1-chloro-3,3,3-trifluoropropene (HCFO-1233zd) and at least one C3 to C6 alkene stabilizing compound comprising a single double bond, said stabilizing compound preferably being 2-methylbut-2-ene.

In the refrigerant fluid F, the HCFO-1233zd may be in the HCFO-1233zdE form or in the form of a mixture of HCFO-1233zdE and HCFO-1233zdZ.

According to a preferred embodiment, the proportion by weight of HCFO-1233zdE relative to the total of HCFO-1233zd is greater than or equal to 90%, or 91%, or 92%, or 93%, or 94%, or 95%, or 96%, or 97%, or 98%, or 99%, or 99.1%, or 99.2%, or 99.3%, or 99.4%, or 99.5%, or 99.6%, or 99.7%, or 99.8%, or 99.9%, or 99.91%, or 99.92%, or 99.93%, or 99.94%, or 99.95%, or 99.96%, or 99.97%, or 99.98%, or 99.99%.

The presence of stabilizing compound(s) in the refrigerant fluid F especially makes it possible to limit or to prevent an increase in the proportion of HCFO-1233zdZ in the composition over time and/or in the case of application of relatively high temperatures.

In the composition of the invention, the proportion by weight of HCFO-1233zd may especially represent from 1 to 5% of the composition; or from 5 to 10% of the composition; or from 10 to 15% of the composition; or from 15 to 20% of the composition; or from 20 to 25% of the composition; or from 25 to 30% of the composition; or from 30 to 35% of the composition; or from 35 to 40% of the composition; or from 40 to 45% of the composition; or from 45 to 50% of the composition; or from 50 to 55% of the composition; or from 55 to 60% of the composition; or from 60 to 65% of the composition; or from 65 to 70% of the composition; or from 70 to 75% of the composition; or from 75 to 80% of the composition; or from 80 to 85% of the composition; or from 85 to 90% of the composition; or from 90 to 95% of the composition; or from 95 to 99% of the composition; or from 99 to 99.5% of the composition; or from 99.5 to 99.9% of the composition; or more than 99.9% of the composition. The content of HCFO-1233zd may also vary within several of the above ranges: for example from 50 to 55% and from 55 to 60%, that is to say from 50 to 60%, etc.

Preferably, the composition of the invention comprises more than 50% by weight of HCFO-1233zd, preferentially from 50% to 99%.

Lubricant

According to the invention, the lubricant may comprise one or more polyol esters.

According to one embodiment, the polyol esters are obtained by reaction of at least one polyol with a carboxylic acid or with a mixture of carboxylic acids.

In the context of the invention, and unless indicated otherwise, "polyol" is intended to mean a compound containing at least two hydroxyl groups (—OH).

Polyol Esters A)

According to one embodiment, the polyol esters according to the invention correspond to the following formula (I):

wherein:
$R^1$ is a linear or branched hydrocarbon-based radical, optionally substituted with at least one hydroxyl group and/or comprising at least one heteroatom selected from the group consisting of —O—, —N—, and —S—;
each $R^2$ is, independently of one another, selected from the group consisting of:
i) H;
ii) an aliphatic hydrocarbon-based radical;
iii) a branched hydrocarbon-based radical;
iv) a mixture of a radical ii) and/or iii) with an aliphatic hydrocarbon-based radical comprising from 8 to 14 carbon atoms; and
n is an integer of at least 2.

In the context of the invention, hydrocarbon-based radical is intended to mean a radical composed of carbon and hydrogen atoms.

According to one embodiment, the polyols have the following general formula (II):

wherein:
$R^1$ is a linear or branched hydrocarbon-based radical, optionally substituted with at least one hydroxyl group, preferably by two hydroxyl groups, and/or comprising at least one heteroatom selected from the group consisting of —O—, —N—, and —S—; and
n is an integer of at least 2.

Preferably, $R^1$ is a linear or branched hydrocarbon-based radical comprising from 4 to 40 carbon atoms, preferably from 4 to 20 carbon atoms.

Preferably, $R^1$ is a linear or branched hydrocarbon-based radical comprising at least one oxygen atom.

Preferably, $R^1$ is a branched hydrocarbon-based radical comprising from 4 to 10 carbon atoms, preferably 5 carbon atoms, substituted with two hydroxyl groups.

According to a preferred embodiment, the polyols comprise from 2 to 10 hydroxyl groups, preferably from 2 to 6 hydroxyl groups.

The polyols according to the invention may comprise one or more oxyalkylene groups; in this particular case, these are polyether polyols.

The polyols according to the invention may also comprise one or more nitrogen atoms. For example, the polyols may be alkanolamines containing from 3 to 6 OH groups. Preferably, the polyols are alkanolamines containing at least two OH groups, and preferably at least three.

According to the present invention, the preferred polyols are selected from the group consisting of ethylene glycol, diethylene glycol, triethylene glycol, propylene glycol, dipropylene glycol, glycerol, neopentyl glycol, 1,2-butanediol, 1,4-butanediol, 1,3-butanediol, pentaerythritol, dipentaerythritol, tripentaerythritol, triglycerol, trimethylolpropane, sorbitol, hexaglycerol and mixtures thereof.

According to the invention, the carboxylic acids may correspond to the following general formula (III):

$$R^2COOH \qquad (III)$$

wherein:
$R^2$ is selected from the group consisting of:
i) H;
ii) an aliphatic hydrocarbon-based radical;
iii) a branched hydrocarbon-based radical;
iv) a mixture of a radical ii) and/or iii) with an aliphatic hydrocarbon-based radical comprising from 8 to 14 carbon atoms.

Preferably, $R^2$ is an aliphatic hydrocarbon-based radical comprising from 1 to 10, preferentially from 1 to 7 carbon atoms, and in particular from 1 to 6 carbon atoms.

Preferably, $R^2$ is a branched hydrocarbon-based radical comprising from 4 to 20 carbon atoms, in particular from 5 to 14 carbon atoms, and preferentially from 6 to 8 carbon atoms.

According to a preferred embodiment, a branched hydrocarbon-based radical has the following formula (IV):

$$-C(R^3)R^4)(R^5) \qquad (IV)$$

wherein $R^3$, $R^4$ and $R^5$ are, independently of one another, an alkyl group, and at least one of the alkyl groups contains at least two carbon atoms. Once such branched alkyl groups are bonded to the carboxyl group, they are known under the name "neo group" and the corresponding acid is known as "neo acid". Preferably, $R^3$ and $R^4$ are methyl groups and $R^{10}$ is an alkyl group comprising at least two carbon atoms.

According to the invention, the radical $R^2$ may comprise one or more carboxyl groups or ester groups such as —$COOR^6$, with $R^6$ representing an alkyl or hydroxyalkyl radical or a hydroxylalkyloxyalkyl group.

Preferably, the acid $R^2COOH$ of formula (III) is a monocarboxylic acid.

Examples of carboxylic acids in which the hydrocarbon-based radical is aliphatic are especially: formic acid, acetic acid, propionic acid, butyric acid, pentanoic acid, hexanoic acid and heptanoic acid.

Examples of carboxylic acids in which the hydrocarbon-based radical is branched are especially: 2-ethyl-n-butyric acid, 2-hexyldecanoic acid, isostearic acid, 2-methylhexanoic acid, 2-methylbutanoic acid, 3-methylbutanoic acid, 3,5,5-trimethylhexanoic acid, 2-ethylhexanoic acid, neoheptanoic acid and neodecanoic acid.

The third type of carboxylic acids which may be used in the preparation of the polyol esters of formula (I) are the carboxylic acids comprising an aliphatic hydrocarbon-based radical comprising from 8 to 14 carbon atoms. Mention may for example be made of: decanoic acid, dodecanoic acid, lauric acid, stearic acid, myristic acid, behenic acid, etc. Among the dicarboxylic acids, mention may be made of maleic acid, succinic acid, adipic acid, sebacic acid, etc.

According to a preferred embodiment, the carboxylic acids used to prepare the polyol esters of formula (I) comprise a mixture of monocarboxylic and dicarboxylic acids, the proportion of monocarboxylic acids being predominant. The presence of dicarboxylic acids results especially in the formation of polyol esters of high viscosity.

In particular, the reaction of formation of the polyol esters of formula (I) by reaction between the carboxylic acid and the polyols is an acid-catalyzed reaction. It is especially a reversible reaction which may be completed by the use of a large amount of acid or by the elimination of the water formed during the reaction.

The esterification reaction may be carried out in the presence of organic or inorganic acids, such as sulfuric acid, phosphoric acid, etc.

Preferably, the reaction is carried out in the absence of catalyst.

The amount of carboxylic acid and of polyol may vary in the mixture depending on the desired results. In the particular case in which all the hydroxyl groups are esterified, a sufficient amount of carboxylic acid must be added to react with all the hydroxyls.

According to one embodiment, during the use of mixtures of carboxylic acids, the latter may react sequentially with the polyols.

According to a preferred embodiment, during the use of a mixture of carboxylic acids, a polyol first reacts with a carboxylic acid, typically the carboxylic acid with the highest molecular weight, followed by reaction with the carboxylic acid having an aliphatic hydrocarbon-based chain.

According to one embodiment, the esters may be formed by reaction between the carboxylic acids (or the anhydride or ester derivatives thereof) and the polyols, in the presence of acids at high temperature, with removal of the water formed during the reaction. Typically, the reaction may be carried out at a temperature of from 75 to 200° C.

According to another embodiment, the polyol esters formed may comprise hydroxyl groups which have not all reacted; in this case, these are partially esterified polyol esters.

According to a preferred embodiment, the polyol esters are obtained from pentaerythritol alcohol and a mixture of carboxylic acids: isononanoic acid, at least one acid having an aliphatic hydrocarbon-based radical comprising from 8 to 10 carbon atoms and heptanoic acid. The preferred polyol esters are obtained from pentaerythritol and a mixture of 70% isononanoic acid, 15% of at least one carboxylic acid having an aliphatic hydrocarbon-based radical comprising from 8 to 10 carbon atoms, and 15% heptanoic acid. Mention may for example be made of the oil Solest 68 sold by CPI Engineering Services Inc.

Polyol Esters B)

According to another embodiment, the polyol esters of the invention comprise at least one ester of one or more branched carboxylic acids comprising at most 8 carbon atoms. The ester is especially obtained by reaction of said branched carboxylic acid with one or more polyols.

Preferably, the branched carboxylic acid comprises at least 5 carbon atoms. In particular, the branched carboxylic acid comprises from 5 to 8 carbon atoms, and it preferentially contains 5 carbon atoms.

Preferably, the abovementioned branched carboxylic acid does not comprise 9 carbon atoms. In particular, said carboxylic acid is not 3,5,5-trimethylhexanoic acid.

According to a preferred embodiment, the branched carboxylic acid is selected from 2-methylbutanoic acid, 3-methylbutanoic acid and mixtures thereof.

According to a preferred embodiment, the polyol is selected from the group consisting of neopentyl glycol, glycerol, trimethylolpropane, pentaerythritol, dipentaerythritol, tripentaerythritol and mixtures thereof.

According to a preferred embodiment, the polyol esters are obtained from:

i) a carboxylic acid selected from 2-methylbutanoic acid, 3-methylbutanoic acid and mixtures thereof; and ii) a polyol selected from the group consisting of neopentyl glycol, glycerol, trimethylolpropane, pentaerythritol, dipentaerythritol, tripentaerythritol and mixtures thereof.

Preferably, the polyol ester is that obtained from 2-methylbutanoic acid and pentaerythritol.

Preferably, the polyol ester is that obtained from 2-methylbutanoic acid and dipentaerythritol. Preferably, the polyol ester is that obtained from 3-methylbutanoic acid and pentaerythritol.

Preferably, the polyol ester is that obtained from 3-methylbutanoic acid and dipentaerythritol.

Preferably, the polyol ester is that obtained from 2-methylbutanoic acid and neopentyl glycol.

Polyol Esters C)

According to another embodiment, the polyol esters according to the invention are poly(neopentyl polyol) esters obtained by:

i) reaction of a neopentyl polyol having the following formula (V):

$$HO \left[ CH_2 - \underset{\underset{R}{|}}{\overset{\overset{R}{|}}{C}} - CH_2 - O \right]_p H \quad (V)$$

wherein:

each R represents, independently of one another, $CH_3$, $C_2H_5$ or $CH_2OH$;

p is an integer ranging from 1 to 4;

with at least one monocarboxylic acid having from 2 to 15 carbon atoms, and in the presence of an acid catalyst, the molar ratio between the carboxyl groups and the hydroxyl groups being less than 1:1, to form a partially esterified poly(neopentyl)polyol composition; and ii) reaction of the partially esterified poly(neopentyl) polyol composition obtained at the end of step i) with another carboxylic acid having from 2 to 15 carbon atoms, to form the final composition of poly(neopentyl polyol) esters.

Preferably, the reaction i) is carried out with a molar ratio ranging from 1:4 to 1:2.

Preferably, the neopentyl polyol has the following formula (VI):

$$R - \underset{\underset{CH_2OH}{|}}{\overset{\overset{CH_2OH}{|}}{C}} - R \quad (VI)$$

wherein each R represents, independently of one another, $CH_3$, $C_2H_5$ or $CH_2OH$.

Preferred neopentyl polyols are those selected from pentaerythritol, dipentaerythritol, tripentaerythritol, tetraerythritol, trimethylolpropane, trimethylolethane and neopentyl glycol. In particular, the neopentyl polyol is pentaerythritol.

Preferably a sole neopentyl polyol is used to produce the POE-based lubricant. In some cases, two or more neopentyl polyols are used. This is especially the case when a commercial pentaerythritol product comprises small amounts of dipentaerythritol, tripentaerythritol and tetraerythritol.

According to a preferred embodiment, the abovementioned monocarboxylic acid comprises from 5 to 11 carbon atoms, preferably from 6 to 10 carbon atoms.

The monocarboxylic acids especially have the following general formula (VII):

$$R'C(O)OH \quad (VII)$$

wherein R' is a linear or branched C1-C12 alkyl radical, a C6-C12 aryl radical, a C6-C30 aralkyl radical. Preferably, R' is a C4-C10, preferentially C5-C9 alkyl radical.

In particular, the monocarboxylic acid is selected from the group consisting of butanoic acid, pentanoic acid, hexanoic acid, heptanoic acid, n-octanoic acid, n-nonanoic acid, n-decanoic acid, 3-methylbutanoic acid, 2-methylbutanoic acid, 2,4-dimethylpentanoic acid, 2-ethylhexanoic acid, 3,3,5-trimethylhexanoic acid, benzoic acid and mixtures thereof.

According to a preferred embodiment, the monocarboxylic acid is n-heptanoic acid or a mixture of n-heptanoic acid with another linear monocarboxylic acid, in particular n-octanoic and/or n-decanoic acid. Such a monocarboxylic acid mixture may comprise between 15 and 100 mol % of heptanoic acid and between 85 and 0 mol % of other monocarboxylic acid(s). In particular, the mixture comprises between 75 and 100 mol % of heptanoic acid and between 25 and 0 mol % of a mixture of octanoic acid and decanoic acid in a molar ratio of 3:2.

According to a preferred embodiment, the polyol esters comprise:

i) from 45% to 55% by weight of an ester of monopentaerythritol with at least one monocarboxylic acid having from 2 to 15 carbon atoms;

ii) less than 13% by weight of an ester of dipentaerythritol with at least one monocarboxylic acid having from 2 to 15 carbon atoms;

iii) less than 10% by weight of an ester of tripentaerythritol with at least one monocarboxylic acid having from 2 to 15 carbon atoms; and iv) at least 25% by weight of an ester of tetraerythritol and other oligomers of pentaerythritol with at least one monocarboxylic acid having from 2 to 15 carbon atoms.

Polyol Esters D)

According to another embodiment, the polyol esters according to the invention have the following formula (VIII):

(VIII)

[Chemical structure showing a branched molecule with three arms containing repeating units with $R^7$, $R^8$, $R^9$, $R^{10}$, $R^{11}$, $R^{12}$ substituents and terminal ester groups $R^{13}$, $R^{14}$, $R^{15}$, with subscripts $a$, $x$, $b$, $y$, $c$, $z$]

wherein:

$R^7$, $R^8$, $R^9$, $R^{10}$, $R^{11}$ and $R^{12}$ are, independently of one another, H or $CH_3$;

a, b, c, y, x and z, are, independently of one another, an integer;

a+x, b+y, and c+z are, independently of one another, integers ranging from 1 to 20;

$R^{13}$, $R^{14}$ and $R^{15}$ are, independently of one another, selected from the group consisting of aliphatic or branched alkyls, alkenyls, cycloalkyls, aryls, alkylaryls, arylalkyls, alkylcycloalkyls, cycloalkylalkyls, arylcycloalkyls, cycloalkylaryls, alkylcycloalkylaryls, alkylarylcycloalkyls, arylcycloalkylalkyls, arylalkylcycloalkyls, cycloalkylalkylaryls and cycloalkylarylalkyls, $R^{13}$, $R^{14}$ and $R^{15}$, having from 1 to 17 carbon atoms, and able to be optionally substituted.

According to a preferred embodiment, each of $R^{13}$, $R^{14}$ and $R^{15}$ represents, independently of one another, a linear or branched alkyl group, an alkenyl group, a cycloalkyl group, said alkyl, alkenyl or cycloalkyl groups possibly comprising at least one heteroatom selected from N, O, Si, F or S. Preferably, each of $R^{13}$, $R^{14}$ and $R^{15}$ independently of one another, has from 3 to 8 carbon atoms, preferably from 5 to 7 carbon atoms.

Preferably, a+x, b+y, and c+z are, independently of one another, integers ranging from 1 to 10, preferentially from 2 to 8, and even more preferentially from 2 to 4.

Preferably, $R^7$, $R^8$, $R^9$, $R^{10}$, $R^{11}$, and $R^{12}$ represent H.

The polyol esters of formula (VIII) above may typically be prepared as described in paragraphs [0027] to [0030] of international application WO2012/177742.

In particular, the polyol esters of formula (VIII) are obtained by esterification of glycerol alkoxylates (as described in paragraph [0027] of WO2012/177742) with one or more monocarboxylic acids having from 2 to 18 carbon atoms.

According to a preferred embodiment, the monocarboxylic acids have one of the following formulae:

$R^{13}COOH$
$R^{14}COOH$ and
$R^{15}COOH$ in which $R^{13}$, $R^{14}$ and $R^{15}$ are as defined above. Derivatives of carboxylic acids may also be used, such as anhydrides, esters and acyl halides.

The esterification may be carried out with one or more monocarboxylic acids. Preferred monocarboxylic acids are those selected from the group consisting of acetic acid, propanoic acid, butyric acid, isobutanoic acid, pivalic acid, pentanoic acid, isopentanoic acid, hexanoic acid, heptanoic acid, octanoic acid, 2-ethylhexanoic acid, 3,3,5-trimethylhexanoic acid, nonanoic acid, decanoic acid, neodecanoic acid, undecanoic acid, dodecanoic acid, tridecanoic acid, myristic acid, pentadecanoic acid, palmitic acid, stearic acid, oleic acid, linoleic acid, palmitoleic acid, citronellic acid, undecenoic acid, lauric acid, undecylenic acid, linolenic acid, arachidic acid, behenic acid, tetrahydrobenzoic acid, hydrogenated or non-hydrogenated abietic acid, 2-ethylhexanoic acid, furoic acid, benzoic acid, 4-acetylbenzoic acid, pyruvic acid, 4-tert-butylbenzoic acid, naphthenic acid, 2-methylbenzoic acid, salicylic acid, isomers thereof, methyl esters thereof and mixtures thereof.

Preferably, the esterification is carried out with one or more monocarboxylic acids selected from the group consisting of pentanoic acid, 2-methylbutanoic acid, n-hexanoic acid, n-heptanoic acid, 3,3,5-trimethylhexanoic acid, 2-ethylhexanoic acid, n-octanoic acid, n-nonanoic acid and isononanoic acid.

Preferably, the esterification is carried out with one or more monocarboxylic acids selected from the group consisting of butyric acid, isobutyric acid, n-pentanoic acid, 2-methylbutanoic acid, 3-methylbutanoic acid, n-hexanoic acid, n-heptanoic acid, n-octanoic acid, 2-ethylhexanoic acid, 3,3,5-trimethylhexanoic acid, n-nonanoic acid, decanoic acid, undecanoic acid, undecylenic acid, lauric acid, stearic acid, isostearic acid and mixtures thereof.

According to another embodiment, the polyol esters according to the invention have the following formula (IX):

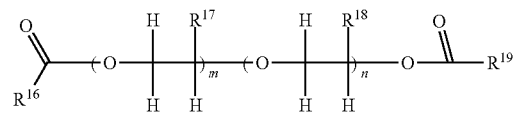

wherein:

each of $R^{17}$ and $R^{18}$, is, independently of one another, H or $CH_3$;

each of m and n, is, independently of one another, an integer, with m+n being an integer ranging from 1 to 10;

$R^{16}$ and $R^{19}$ are, independently of one another, selected from the group consisting of aliphatic or branched alkyls, alkenyls, cycloalkyls, aryls, alkylaryls, arylalkyls, alkylcycloalkyls, cycloalkylalkyls, arylcycloalkyls, cycloalkylaryls, alkylcycloalkylaryls, alkylarylcycloalkyls, arylcycloalkylalkyls, arylalkylcycloalkyls, cycloalkylalkylaryls and cycloalkylarylalkyls, $R^{16}$ and $R^{19}$, having from 1 to 17 carbon atoms, and able to be optionally substituted.

According to a preferred embodiment, each of $R^{16}$ and $R^{19}$ represents, independently of one another, a linear or branched alkyl group, an alkenyl group, a cycloalkyl group, said alkyl, alkenyl or cycloalkyl groups possibly comprising at least one heteroatom selected from N, O, Si, F or S. Preferably, each of $R^{16}$ and $R^{19}$, independently of one another, has from 3 to 8 carbon atoms, preferably from 5 to 7 carbon atoms.

According to a preferred embodiment, each of $R^{17}$ and $R^{18}$ represents H, and/or m+n is an integer ranging from 2 to 8, from 4 to 10, from 2 to 5, or from 3 to 5. In particular, m+n is 2, 3, or 4.

According to a preferred embodiment, the polyol esters of formula (IX) above are diesters of triethylene glycol, diesters of tetraethylene glycol, in particular with one or two monocarboxylic acids having from 4 to 9 carbon atoms.

The polyol esters of formula (IX) above may be prepared by esterification of an ethylene glycol, of a propylene glycol or of an oligo- or polyalkylene glycol (which may be an oligo- or polyethylene glycol, oligo- or polypropylene glycol or an ethylene glycol-propylene glycol block copolymer) with one or two monocarboxylic acids having from 2 to 18 carbon atoms. The esterification may be carried out identically to the esterification reaction carried out for preparing the polyol esters of formula (VIII) above.

In particular, monocarboxylic acids identical to those used for preparing the polyol esters of formula (VIII) above may be used to form the polyol esters of formula (IX).

According to one embodiment, the lubricant based on polyol esters according to the invention comprises from 20 to 80%, preferably from 30 to 70%, and preferentially from 40 to 60% by weight of at least one polyol ester of formula (VIII), and from 80 to 20%, preferably from 70 to 30%, and preferentially from 60 to 40% by weight of at least one polyol ester of formula (IX).

Generally, some alcohol functions may not be esterified during the esterification reaction, however the proportion thereof remains low. Thus, the POEs may comprise between 0 and 5 relative mol % of $CH_2OH$ units relative to $—CH_2—O—C(=O)$-units.

The POE lubricants preferred according to the invention are those having a viscosity from 1 to 1000 centiStokes (cSt) at 40° C., preferably from 10 to 200 cSt, even more preferentially from 20 to 100 cSt, and advantageously from 30 to 80 cSt.

The international classification of oils is given by standard ISO3448 (NF T60-141), according to which the oils are designated by their mean class of viscosity measured at a temperature of 40° C.

Composition

In the composition of the invention, the proportion by weight of refrigerant fluid F may especially represent from 1 to 5% of the composition; or from 5 to 10% of the composition; or from 10 to 15% of the composition; or from 15 to 20% of the composition; or from 20 to 25% of the composition; or from 25 to 30% of the composition; or from 30 to 35% of the composition; or from 35 to 40% of the composition; or from 40 to 45% of the composition; or from 45 to 50% of the composition; or from 50 to 55% of the composition; or from 55 to 60% of the composition; or from 60 to 65% of the composition; or from 65 to 70% of the composition; or from 70 to 75% of the composition; or from 75 to 80% of the composition; or from 80 to 85% of the composition; or from 85 to 90% of the composition; or from 90 to 95% of the composition; or from 95 to 99% of the composition; or from 99 to 99.5% of the composition; or from 99.5 to 99.9% of the composition; or more than 99.9% of the composition. The content of refrigerant fluid F may also vary within several of the above ranges: for example from 50 to 55% and from 55 to 60%, that is to say from 50 to 60%, etc.

According to a preferred embodiment, the composition of the invention comprises more than 50% by weight of refrigerant fluid F, and in particular from 50% to 99% by weight relative to the total weight of the composition.

In the composition of the invention, the proportion by weight of lubricant based on polyol esters (POEs) may especially represent from 1 to 5% of the composition; or from 5 to 10% of the composition; or from 10 to 15% of the composition; or from 15 to 20% of the composition; or from 20 to 25% of the composition; or from 25 to 30% of the composition; or from 30 to 35% of the composition; or from 35 to 40% of the composition; or from 40 to 45% of the composition; or from 45 to 50% of the composition; or from 50 to 55% of the composition; or from 55 to 60% of the composition; or from 60 to 65% of the composition; or from 65 to 70% of the composition; or from 70 to 75% of the composition; or from 75 to 80% of the composition; or from 80 to 85% of the composition; or from 85 to 90% of the composition; or from 90 to 95% of the composition; or from 95 to 99% of the composition; or from 99 to 99.5% of the composition; or from 99.5 to 99.9% of the composition; or more than 99.9% of the composition. The content of lubricant may also vary within several of the above ranges: for example from 50 to 55% and from 55 to 60%, that is to say from 50 to 60%, etc. For example, the content of lubricant represents between 10% and 50% by weight of the composition.

According to one embodiment, the composition according to the invention comprises:

a refrigerant fluid F comprising 1-chloro-3,3,3-trifluoropropene (HCFO-1233zd) and optionally a C3 to C6 alkene stabilizing compound comprising a single double bond as described above; and at least one lubricant based on polyol esters (POEs), especially selected from the polyol esters A), B), C) or D) described above, especially the polyol esters of formulae (I), (VIII) or (XI).

According to a preferred embodiment, the composition comprises:

a refrigerant fluid F comprising 1-chloro-3,3,3-trifluoropropene (HCFO-1233zd), the proportion by weight of HCFO-1233zdE relative to the total of HCFO-1233zd being in particular greater than or equal to 95%, or to 99%, or to 99.9%, and a stabilizing compound selected from 2-methylbut-2-ene and 3-methylbut-2-ene; and at least one lubricant based on polyol esters, especially of formula (I).

The composition according to the invention may comprise one or more additives (which are essentially not heat-transfer compounds for the envisaged application).

The additives may especially be selected from nanoparticles, stabilizers (other than the stabilizing compounds of the invention), surfactants, trace agents, fluorescent agents, odorizing agents and solubilizing agents.

Preferably, the additives are not lubricants.

According to one embodiment, the composition of the invention is a heat-transfer composition.

According to a preferred embodiment, the present invention relates to a heat-transfer composition comprising:

a refrigerant fluid F comprising 1-chloro-3,3,3-trifluoropropene (HCFO-1233zd), at least one lubricant based on polyol esters (POEs); and at least one additive selected from nanoparticles, stabilizers (other than the stabilizing compounds of the invention), surfactants, trace agents, fluorescent agents, odorizing agents and solubilizing agents.

The stabilizer(s), when they are present, preferably represent at most 5% by weight in the heat-transfer composition. Among the stabilizers, mention may especially be made of nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, eoxides (alkyl which is optionally fluorinated or perfluorinated or alkenyl or aromatic) such as n-butyl glycidyl ether, hexanediol diglycidyl ether, allyl glycidyl ether, butylphenylglycidyl ether, phosphites, phosphonates, thiols and lactones.

By way of nanoparticles, use may especially be made of charcoal nanoparticles, metal (copper, aluminum) oxides, $TiO_2$, $Al_2O_3$, $MoS_2$, etc.

By way of tracers (capable of being detected), mention may be made of deuterated or non-deuterated hydrofluorocarbons, deuterated hydrocarbons, perfluorocarbons, fluoroethers, brominated compounds, iodinated compounds, alcohols, aldehydes, ketones, nitrous oxide and combinations thereof. The tracer is different than the heat-transfer compound(s) making up the heat-transfer fluid (refrigerant fluid F).

By way of dissolving agents, mention may be made of hydrocarbons, dimethyl ether, polyoxyalkylene ethers, amides, ketones, nitriles, chlorocarbons, esters, lactones, aryl ethers, fluoroethers and 1,1,1-trifluoroalkanes. The solubilizing agent is different than the heat-transfer compound(s) making up the heat-transfer fluid (refrigerant fluid F).

By way of fluorescent agents, mention may be made of naphthalimides, perylenes, coumarins, anthracenes, phenanthracenes, xanthenes, thioxanthenes, naphthoxanthenes, fluoresceins and derivatives and combinations thereof.

By way of odorizing agents, mention may be made of alkyl acrylates, allyl acrylates, acrylic acids, acryl esters, alkyl ethers, alkyl esters, alkynes, aldehydes, thiols, thioethers, disulfides, allylisothiocyanates, alkanoic acids, amines, norbornenes, norbornene derivatives, cyclohexene, heterocyclic aromatic compounds, ascaridole, o-methoxy (methyl)phenol and combinations thereof.

The composition according to the invention may also comprise at least one other heat-transfer compound, in addition to the HCFO-1233zd. Such other optional heat-transfer compound may especially be a hydrocarbon, ether, hydrofluoroether, hydrofluorocarbon, hydrochlorofluorocarbon, hydrofluoroolefin, hydrochloroolefin or hydrochlorofluoroolefin compound.

By way of example, said other heat-transfer compound may be selected from 1,1,1,4,4,4-hexafluorobut-2-ene (HFO-1336mmz, E or Z isomer), 3,3,4,4,4-pentafluorobut-1-ene (HFO-1345fz), 2,4,4,4-tetrafluorobut-1-ene (HFO-1354mfy), 1,1,1,3,3-pentafluoropropane (HFC-245fa), 2,3,3,3-tetrafluoropropene (HFO-1234yf), 1,3,3,3-tetrafluoropropene (HFO 1234ze), difluoromethane (HFC-32), 1,1,1,2-tetrafluoroethane (HFC-134a), 1,1,2,2-tetrafluoroethane (HFC-134), 1,1-difluoroethane (HFC-152a), pentafluoroethane (HFC-125), 1,1,1,3,3-pentafluorobutane (HFC-365mfc), methoxynonafluorobutane (HFE7100), butane (HC-600), 2-methylbutane (HC-601a), pentane (HC-601), ethyl ether, methyl acetate and combinations thereof.

The term "heat-transfer compound", respectively "heat-transfer fluid" or "refrigerant fluid" is intended to mean a compound, respectively a fluid, capable of absorbing heat by evaporating at low temperature and low pressure and of releasing heat by condensing at high temperature and high pressure, in a vapor-compression circuit. In general, a heat-transfer fluid can comprise just one, two, three or more than three heat-transfer compounds. In particular, the refrigerant fluid F is a heat-transfer fluid.

"Heat-transfer composition" is intended to mean a composition comprising a heat-transfer fluid and optionally one or more additives which are not heat-transfer compounds for the envisaged application. In particular, the composition according to the invention is a heat-transfer composition.

Uses

The present invention also relates to the use of the abovementioned composition as heat-transfer composition in a vapor compression circuit.

The present invention relates to the use of the composition according to the invention as heat-transfer composition in a vapor compression system or in a heat engine.

The present invention also relates to a heat-transfer process based on the use of a facility comprising a vapor compression system which contains the composition of the invention as heat-transfer composition. The heat-transfer process may be a process for heating or cooling a fluid or body.

According to one embodiment, the vapor compression system is:
- an air conditioning system; or
- a refrigeration system; or
- a freezing system; or
- a heat pump system.

The composition of the invention may also be used in a process for producing mechanical working or electricity, especially in accordance with a Rankine cycle.

The invention also relates to a heat-transfer facility comprising a vapor compression circuit containing the above composition as heat-transfer composition.

According to one embodiment, this facility is selected from mobile or stationary facilities for refrigeration, heating (heat pump), air conditioning and freezing and heat engines.

It may especially be a heat pump facility, in which case the fluid or body that is heated (generally air and optionally one or more products, objects or organisms) is located in a room or a vehicle passenger compartment (for a mobile facility). According to a preferred embodiment, it is an air conditioning circuit, in which case the fluid or body that is cooled (generally air and optionally one or more products, objects or organisms) is located in a room or a vehicle passenger compartment (for a mobile facility). It may be a refrigeration facility or a freezing facility (or cryogenic facility), in which case the fluid or body that is cooled generally comprises air and one or more products, objects or organisms located in a room or a container.

Another subject of the invention is a process for heating or cooling a fluid or a body by means of a vapor-compression system containing a heat-transfer composition, said process successively comprising the evaporation of the heat-transfer composition, compression of the heat-transfer composition, condensation of the heat-transfer composition and expansion of the heat-transfer composition, wherein the heat-transfer composition is the composition described above.

Another subject of the invention is a process for producing electricity by means of a heat engine, said process successively comprising the evaporation of the heat-transfer composition, expansion of the heat-transfer composition in a turbine making it possible to generate electricity, condensation of the heat-transfer composition and compression of the heat-transfer composition, wherein the heat-transfer composition is the composition described above.

The vapor-compression circuit containing a heat-transfer composition comprises at least one evaporator, one compressor, one condenser and one expander, and also lines for transporting heat-transfer fluid between these elements. The evaporator and the condenser comprise a heat exchanger which allows heat exchange between the heat-transfer composition and another fluid or body.

By way of compressor, use may especially be made of a centrifugal compressor having one or more stages or of a centrifugal mini-compressor. Rotary compressors, piston compressors or screw compressors may also be used. The compressor may be driven by an electric motor or by a gas turbine (for example fed by the exhaust gases of a vehicle, for mobile applications) or by gearing.

A centrifugal compressor is characterized in that it uses rotating elements to radially accelerate the heat-transfer composition; it typically comprises at least one rotor and a diffuser housed in a chamber. The heat-transfer composition is introduced into the center of the rotor and circulates towards the periphery of the rotor while undergoing acceleration. Thus, on the one hand the static pressure increases in the rotor and, above all on the other hand, at the diffuser, the speed is converted into an increase in the static pressure. Each rotor/diffuser assembly constitutes a compressor stage. Centrifugal compressors may comprise from 1 to 12 stages depending on the desired final pressure and the volume of fluid to be treated.

The degree of compression is defined as the ratio of the absolute pressure of the heat-transfer composition at the outlet to the absolute pressure of said composition at the inlet.

The rotational speed for large centrifugal compressors ranges from 3000 to 7000 revolutions per minute. Small centrifugal compressors (or centrifugal mini-compressors)

generally operate at a rotational speed which ranges from 40 000 to 70 000 revolutions per minute and comprise a small rotor (generally less than 0.15 m).

Use may be made of a multi-stage rotor to improve the efficiency of the compressor and limit the energy cost (compared to a single-stage rotor). For a two-stage system, the outlet of the first stage of the rotor feeds the inlet of the second rotor. The two rotors may be mounted on a single axis. Each stage may provide a compression ratio of the fluid of around 4 to 1, that is to say that the absolute outlet pressure may be equal to around four times the absolute suction pressure. Examples of two-stage centrifugal compressors, in particular for motor vehicle applications, are described in documents U.S. Pat. No. 5,065,990 and U.S. Pat. No. 5,363,674.

The centrifugal compressor may be driven by an electric motor or by a gas turbine (for example fed by the exhaust gases of a vehicle, for mobile applications) or by gearing.

The facility may comprise a coupling of the expansion valve with a turbine in order to produce electricity (Rankine cycle).

The facility may also optionally comprise at least one heat-transfer fluid circuit used to transmit the heat (with or without change of state) between the heat-transfer composition circuit and the fluid or body to be heated or cooled.

The facility may also optionally comprise two (or more) vapor-compression circuits containing identical or distinct heat-transfer compositions. For example, the vapor-compression circuits can be coupled to one another.

The vapor-compression circuit operates according to a conventional cycle of vapor-compression. The cycle comprises the change of state of the heat-transfer composition from a liquid phase (or liquid/vapor dual phase) to a vapor phase at a relatively low pressure, then the compression of the composition in vapor phase until a relatively high pressure is reached, the change of state (condensation) of the heat-transfer composition from the vapor phase to the liquid phase at a relatively high pressure, and the reduction of the pressure so as to recommence the cycle.

In the case of a cooling process, heat originating from the fluid or from the body that is being cooled (directly or indirectly, via a heat-transfer fluid) is absorbed by the heat-transfer composition during the evaporation of the latter, at a relatively low temperature compared to the surroundings. The cooling processes comprise air-conditioning processes (with mobile facilities, for example in vehicles, or stationary facilities), refrigeration processes and freezing or cryogenics processes.

In the case of a heating process, heat is transferred (directly or indirectly, via a heat-transferring fluid) from the heat-transfer composition, during the condensation thereof, to the fluid or to the body that is being heated, at a relatively high temperature compared with the surroundings. The facility which makes it possible to carry out the heat transfer is in this case called a "heat pump".

Use may be made of any type of heat exchanger for the implementation of the heat-transfer compositions according to the invention, and especially cocurrent heat exchangers, or preferably countercurrent heat exchangers.

However, according to a preferred embodiment, the invention provides that the cooling and heating processes and the corresponding facilities comprise a heat exchanger which is countercurrent with respect either to the condenser, or to the evaporator. Indeed, the heat-transfer compositions according to the invention are particularly effective with countercurrent heat exchangers. Preferably, both the evaporator and the condenser comprise a countercurrent heat exchanger.

According to the invention, "countercurrent heat exchanger" is intended to mean a heat exchanger in which heat is exchanged between a first fluid and a second fluid, the first fluid at the inlet of the exchanger exchanging heat with the second fluid at the outlet of the exchanger, and the first fluid at the outlet of the exchanger exchanging heat with the second fluid at the inlet of the exchanger.

For example, countercurrent heat exchangers include devices in which the flow of the first fluid and the flow of the second fluid are in opposite directions or virtually opposite directions. Exchangers operating in cross-current mode with a countercurrent tendency are also included among the countercurrent heat exchangers within the meaning of the present application.

In the "low-temperature refrigeration" processes, the inlet temperature of the heat-transfer composition at the evaporator is preferably from −45° C. to −15° C., especially from −40° C. to −20° C., more particularly preferably from −35° C. to −25° C. and for example around −30° C.; and the temperature at the beginning of the condensation of the heat-transfer composition at the condenser is preferably from 25° C. to 80° C., especially from 30° C. to 60° C., more particularly preferably from 35° C. to 55° C. and for example around 40° C.

In the "moderate-temperature refrigeration" processes, the inlet temperature of the heat-transfer composition at the evaporator is preferably from −20° C. to 10° C., especially from −15° C. to 5° C., more particularly preferably from −10° C. to 0° C. and for example around −5° C.; and the temperature at the beginning of the condensation of the heat-transfer composition at the condenser is preferably from 25° C. to 80° C., especially from 30° C. to 60° C., more particularly preferably from 35° C. to 55° C. and for example around 50° C. These processes may be refrigeration or air conditioning processes.

In the "moderate-temperature heating" processes, the inlet temperature of the heat-transfer composition at the evaporator is preferably from −20° C. to 10° C., especially from −15° C. to 5° C., more particularly preferably from −10° C. to 0° C. and for example around −5° C.; and the temperature at the beginning of the condensation of the heat-transfer composition at the condenser is preferably from 25° C. to 80° C., especially from 30° C. to 60° C., more particularly preferably from 35° C. to 55° C. and for example around 50° C.

In the "high-temperature heating" processes, the inlet temperature of the heat-transfer composition at the evaporator is preferably from −20° C. to 90° C., especially from 10° C. to 90° C., more particularly preferably from 50° C. to 90° C. and for example around 80° C.; and the temperature at the beginning of the condensation of the heat-transfer composition at the condenser is preferably from 70° C. to 160° C., especially from 90° C. to 150° C., more particularly preferably from 110° C. to 140° C. and for example around 135° C.

The compositions according to the invention are particularly advantageous in refrigerated transport.

Refrigerated transport is considered to be any movement of perishable products inside a refrigerated space. Food or pharmaceutical products represent a large portion of perishable products.

Refrigerated transport may be carried out by truck, railroad or ship, optionally with the aid of intermodal containers that are equally compatible with trucks, railroads or ships.

In refrigerated transport, the temperature of the refrigerated spaces is between −30° C. and 16° C. The refrigerant charge in transport by truck, railroad or intermodal containers varies between 4 kg and 8 kg of refrigerant. The facilities in ships may contain between 100 and 500 kg.

The most used refrigerant to date is R404A.

The operating temperatures of the refrigerating facilities are a function of the refrigeration temperature requirements and outside climatic conditions. The same refrigerating system must be capable of covering a wide temperature range between −30° C. and 16° C. and operating both in cold and hot climates.

The most restrictive condition in terms of evaporation temperature is −30° C.

Also preferably, in the facility according to the invention, the temperature of the composition used as heat-transfer composition remains greater than the solidification temperature of the stabilizing compound as defined above, in order to avoid any deposition of solid material in the circuit.

All the embodiments described above may be combined with each other. Thus, each preferred compound of the composition may be combined with each preferred polyol ester (esters A, B, C or D) in the different proportions mentioned. The different preferred compositions may be used in the various applications described above.

The following examples illustrate the invention without however limiting it.

EXAMPLES

The thermal stability tests were carried out according to standard ASHRAE 97-2007: "sealed glass tube method to test the chemical stability of materials for use within refrigerant systems".

The test conditions are as follows:
mass of fluid (with stabilizer): 2 g
mass of lubricant: 5 g
dry air: 0.2 millimol
temperature: 180° C.
duration: 14 days
2 commercial lubricants were tested:
  the oil PVE Bitzer 32 (Bitzer/Idemitsu);
  the oil Solest 68 (CPI Engineering services inc).
The refrigerant fluid F comprises:
  0.5% by weight of 2-methyl-2-butene; and
  99.5% by weight of HCFO-1233zd.
The lubricant was introduced into a 16 ml glass tube. The tube was then evacuated under vacuum, then the fluid F was added along with air. The tube was then welded in order to close it, and placed in an oven at 180° C. for 14 days.

At the end of the test, the gas phase was recovered in order to be analyzed by gas chromatography: the main impurities were identified by GC/MS (gas chromatography-mass spectrometry).

| Oil | | Invention Solest 68 | | Comparative PVE Bitzer 32 | |
|---|---|---|---|---|---|
| mol % | HFO-1233zdE | 98.691 | 92.623 | 88.194 | 90.070 |
| | HFO-1233zdZ | 0.039 | 0.040 | 0.035 | 0.034 |
| | 2-methyl-2-butene | 0.838 | 0.860 | 0.924 | 0.944 |
| | Original impurities (in the refrigerant fluid, before mixing with the lubricant) | <0.1 | <0.1 | <0.1 | <0.1 |
| | New impurities | 0.387 | 0.420 | 10.748 | 8.87 |

The GC analysis shows the formation of a very high percentage of new impurities (greater than 8 mol %) with the PVE oil compared to a very low percentage with the POE oil (less than 0.5 mol %).

Thus, the tests show that the mixture of HFO-1233zd/POE oil is more thermally stable than the mixture of HFO-1233zd/PVE oil.

The invention claimed is:

1. A composition comprising at least one lubricant based on polyol esters and a refrigerant fluid F comprising 1-chloro-3,3,3-trifluoropropene and at least one C3 to C6 alkene stabilizing compound comprising a single double bond.

2. The composition as claimed in claim 1, wherein the stabilizing compound is selected from the group consisting of but-1-ene; cis-but-2-ene; trans-but-2-ene; 2-methylprop-1-ene; pent-1-ene; cis-pent-2-ene; trans-pent-2-ene; 2-methylbut-1-ene;
2-methylbut-2-ene; 3-methylbut-1-ene, and the mixtures thereof.

3. The composition as claimed in claim 1, wherein the stabilizing compound is chosen from 2-methylbut-2-ene and 3-methylbut-1-ene.

4. The composition as claimed in claim 1, wherein the 1-chloro-3,3,3-trifluoropropene is in the trans form in a proportion by weight of greater than or equal to 90%.

5. The composition as claimed in claim 1, wherein the polyol esters correspond to the following formula (I):

$$R^1[OC(O)R^2]_n \qquad (I)$$

wherein:
R$^1$ is a linear or branched hydrocarbon-based radical, optionally substituted with at least one hydroxyl group and/or comprising at least one heteroatom selected from the group consisting of —O—, —N—, and —S—;
each R$^2$ is, independently of one another, selected from the group consisting of:
  i) H;
  ii) an aliphatic hydrocarbon-based radical;
  iii) a branched hydrocarbon-based radical;
  iv) a mixture of a radical ii) and/or iii) with an aliphatic hydrocarbon-based radical comprising from 8 to 14 carbon atoms; and
is an integer of at least 2.

6. The composition as claimed in claim 1, wherein the polyol esters are obtained from polyol selected from the group consisting of neopentyl glycol, glycerol, trimethylolpropane, pentaerythritol, dipentaerythritol, tripentaerythritol and mixtures thereof.

7. The composition as claimed in claim 1, wherein the polyol esters are obtained from at least one branched carboxylic acid comprising from 5 to 8 carbon atoms.

8. The composition as claimed in claim 1, wherein the polyol esters are poly(neopentyl polyol) esters obtained by:
  i) reaction of a neopentyl polyol having the following formula (V):

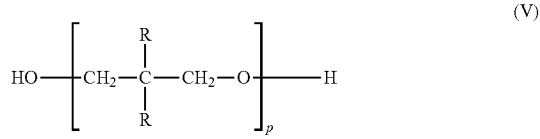

(V)

wherein:
  each R represents, independently of one another, CH$_3$, C$_2$H$_5$ or CH$_2$OH;
  p is an integer ranging from 1 to 4;
  with at least one monocarboxylic acid having from 2 to 15 carbon atoms, in the presence of an acid catalyst, the molar ratio between the carboxyl groups and the hydroxyl groups being less than 1:1, to form a partially esterified poly(neopentyl)polyol composition; and ii) reaction of the partially esterified poly(neopentyl) polyol composition obtained at the end of step i) with another carboxylic acid having from 2 to 15 carbon atoms, to form the composition of poly(neopentyl polyol) esters.

9. The composition as claimed in claim 1, wherein the polyol esters have one of the following formulae (VIII) or (IX):

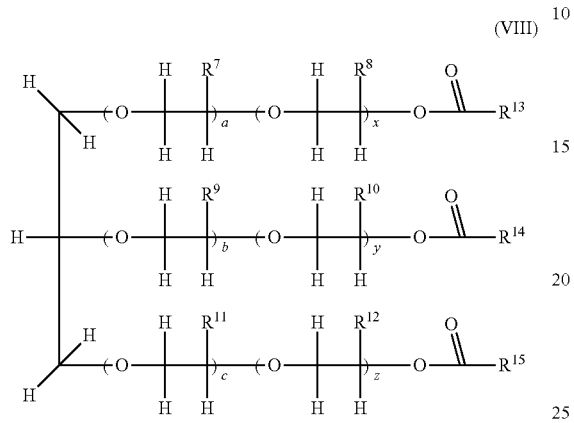

(VIII)

wherein:
$R^7$, $R^8$, $R^9$, $R^{10}$, $R^{11}$ and $R^{12}$ are, independently of one another, H or $CH_3$;
a, b, c, y, x and z, are, independently of one another, an integer;
a+x, b+y, and c+z are, independently of one another, integers ranging from 1 to 20;
$R^{13}$, $R^{14}$ and $R^{15}$ are, independently of one another, selected from the group consisting of aliphatic or branched alkyls, alkenyls, cycloalkyls, aryls, alkylaryls, arylalkyls, alkylcycloalkyls, cycloalkylalkyls, arylcycloalkyls, cycloalkylaryls, alkylcycloalkylaryls, alkylarylcycloalkyls, arylcycloalkylalkyls, arylalkylcycloalkyls, cycloalkylalkylaryls and cycloalkylarylalkyls,
$R^{13}$, $R^{14}$ and $R^{15}$, having from 1 to 17 carbon atoms, and able to be optionally substituted
or

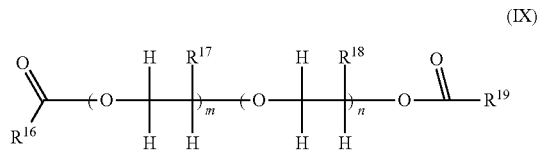

(IX)

wherein:
each of $R^{17}$ and $R^{18}$, is, independently of one another, H or $CH_3$;
each of m and n, is, independently of one another, an integer, with m+n being an integer ranging from 1 to 10;
$R^{16}$ and $R^{19}$ are, independently of one another, selected from the group consisting of aliphatic or branched alkyls, alkenyls, cycloalkyls, aryls, alkylaryls, arylalkyls, alkylcycloalkyls, cycloalkylalkyls, arylcycloalkyls, cycloalkylaryls, alkylcycloalkylaryls, alkylarylcycloalkyls, arylcycloalkylalkyls, arylalkylcycloalkyls, cycloalkylalkylaryls and cycloalkylarylalkyls,
$R^{16}$ and $R^{19}$, having from 1 to 17 carbon atoms, and able to be optionally substituted.

10. The composition as claimed in claim 1, wherein the lubricant represents between 10% and 50% by weight of the composition.

11. A vapor-compression system or a heat engine comprising the composition as claimed claim 1 as a heat-transfer composition.

12. A heat-transfer facility comprising a circuit containing a composition as claimed in claim 1 as heat-transfer composition.

13. The facility as claimed in claim 12, selected from mobile or stationary facilities for heating via heat pump, air conditioning, refrigeration, freezing and heat engines.

14. A process for producing electricity by means of a heat engine, said process successively comprising the evaporation of the heat-transfer composition, expansion of the heat-transfer composition in a turbine making it possible to generate electricity, condensation of the heat-transfer composition and compression of the heat-transfer composition, wherein the heat-transfer composition is a composition as claimed in claim 1.

15. A process for heating or cooling a fluid or a body by means of a vapor-compression system containing a heat-transfer composition, said process successively comprising the evaporation of the heat-transfer composition, compression of the heat-transfer composition, condensation of the heat composition and expansion of the heat-transfer composition, wherein the heat-transfer composition is a composition as claimed in claim 1.

* * * * *